US012791756B2

(12) United States Patent
Sherlock et al.

(10) Patent No.: US 12,791,756 B2
(45) Date of Patent: Nov. 10, 2026

(54) MOBILE WORK MACHINE CONTROL BASED ON WORKSITE CONDITION PERFORMANCE IMPACT

(71) Applicant: Deere & Company, Moline, IL (US)

(72) Inventors: Lance R. Sherlock, Asbury, IA (US); Piya Salgia, Wheaton, IL (US)

(73) Assignee: Deere & Company, Moline, IL (US)

( * ) Notice: Subject to any disclaimer, the term of this patent is extended or adjusted under 35 U.S.C. 154(b) by 534 days.

(21) Appl. No.: 18/489,298

(22) Filed: Oct. 18, 2023

(65) Prior Publication Data

US 2024/0069243 A1 Feb. 29, 2024

Related U.S. Application Data

(63) Continuation of application No. 16/658,684, filed on Oct. 21, 2019, now Pat. No. 11,828,904.

(51) Int. Cl.
*G01W 1/10* (2006.01)
*B64U 101/32* (2023.01)
(Continued)

(52) U.S. Cl.
CPC ............... *G01W 1/10* (2013.01); *E02F 9/205* (2013.01); *G01W 1/02* (2013.01); *G05D 1/0219* (2013.01); *G06Q 10/06313* (2013.01); *G06Q 50/08* (2013.01); *H04L 67/12* (2013.01); *B64U 2101/32* (2023.01); *B64U 2101/35* (2023.01);
(Continued)

(58) Field of Classification Search
CPC ..... G01W 1/10; G01W 1/02; G01W 2203/00; G01W 2201/00; G01W 1/00; B64C 39/024; B64C 2201/125; E02F 9/205; E02F 9/2054; E02F 9/261; G05D 1/0219; G05D 1/0212; G05D 2201/0202; G05D 2201/02; G05D 2201/0201; G06Q 10/06313; G06Q 50/08; H04L 67/12; H04L 4/44;
(Continued)

(56) References Cited

U.S. PATENT DOCUMENTS

| | | | |
|---|---|---|---|
| 8,560,145 | B2 | 10/2013 | Anderson |
| 2016/0298306 | A1 | 10/2016 | de Kontz et al. |

(Continued)

FOREIGN PATENT DOCUMENTS

| | | | |
|---|---|---|---|
| CA | 2980350 | A1 | 11/2018 |
| CN | 202449771 | U | 9/2012 |

(Continued)

OTHER PUBLICATIONS

German Search Report issued in counterpart application No. 102020211016.6 dated Apr. 13, 2021, 10 pages.

*Primary Examiner* — Christian T Bryant
(74) *Attorney, Agent, or Firm* — Christopher J. Volkmann; KELLY, HOLT & CHRISTENSON PLLC

(57) ABSTRACT

A computer-implemented method includes obtaining a worksite condition corresponding to a worksite operation of a mobile work machine, generating a machine performance metric representing operational performance of the mobile work machine for the worksite operation, generating a machine impact metric based on a comparison of the machine performance metric and a base performance metric, generating a correlation between the machine impact metric and the worksite condition, and generating a machine control signal based on the correlation.

20 Claims, 13 Drawing Sheets

(51) Int. Cl.

| | |
|---|---|
| ***B64U 101/35*** | (2023.01) |
| ***E02F 9/20*** | (2006.01) |
| ***E02F 9/26*** | (2006.01) |
| ***G01W 1/00*** | (2006.01) |
| ***G01W 1/02*** | (2006.01) |
| ***G05B 17/00*** | (2006.01) |
| ***G05B 23/00*** | (2006.01) |
| ***G05D 1/00*** | (2024.01) |
| ***G06Q 10/0631*** | (2023.01) |
| ***G06Q 50/08*** | (2012.01) |
| ***H04L 67/12*** | (2022.01) |

(52) U.S. Cl.
CPC ........ *B64U 2201/00* (2023.01); *E02F 9/2054* (2013.01); *E02F 9/261* (2013.01); *G01W 1/00* (2013.01); *G01W 2201/00* (2013.01); *G01W 2203/00* (2013.01); *G05B 17/00* (2013.01); *G05B 23/00* (2013.01); *G05D 1/0212* (2013.01)

(58) Field of Classification Search
CPC .... G05B 17/00; G05B 23/00; B64U 2101/32; B64U 2101/35; B64U 2201/00; H04W 4/44
See application file for complete search history.

(56) References Cited

U.S. PATENT DOCUMENTS

| | | | | |
|---|---|---|---|---|
| 2016/0366813 | A1 | 12/2016 | Haneda et al. | |
| 2017/0311534 | A1 | 11/2017 | Rusciolelli et al. | |
| 2019/0100309 | A1 | 4/2019 | Flood et al. | |
| 2019/0114847 | A1 | 4/2019 | Wagner et al. | |
| 2020/0032488 | A1 | 1/2020 | Kean et al. | |
| 2021/0007277 | A1 * | 1/2021 | Anderson | G05D 1/0088 |
| 2021/0032080 | A1 | 2/2021 | Wiethor | |

FOREIGN PATENT DOCUMENTS

| | | | |
|---|---|---|---|
| DE | 19514223 | A1 | 10/1996 |
| DE | 102007007385 | A1 | 8/2008 |
| DE | 102015011246 | A1 | 3/2017 |
| EP | 0253101 | A2 | 1/1988 |
| JP | 6496182 | | 4/2019 |
| KR | 20040058808 | A | 7/2004 |

* cited by examiner

MOBILE WORK MACHINE CONTROL BASED ON WORKSITE CONDITION PERFORMANCE IMPACT

CROSS-REFERENCE TO RELATED APPLICATION

The present application is a continuation of and claims priority of U.S. patent application Ser. No. 16/658,684, filed Oct. 21, 2019, the content of which is hereby incorporated by reference in its entirety.

FIELD OF THE DESCRIPTION

The present description relates to the use of equipment in worksite operations. More specifically, but not by limitation, the present description relates to a control system for a mobile work machine that uses a weather model to control worksite operations.

BACKGROUND

There are a wide variety of different types of mobile worksite equipment, such as construction machines, turf care machines, forestry machines, agricultural machines, among others. Many of these pieces of mobile equipment have mechanisms that are controlled by an operator in performing worksite operations. Of course, some or all operations of such machine can automatic or semi-automatic.

For instance, a construction machine can have multiple different mechanical, electrical, hydraulic, pneumatic and electro-mechanical subsystems, among others, all of which can be operated by an operator in an operator compartment or cab. Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others.

A work machine may encounter varying worksite conditions, such as changing weather or terrain conditions. Such conditions can have a negative impact on operation and performance of the machine, as well as worksite planning, especially in the case of extreme weather conditions. Such conditions can even pose a danger to an operator and/or damage to the machine.

The discussion above is merely provided for general background information and is not intended to be used as an aid in determining the scope of the claimed subject matter.

SUMMARY

A worksite control system includes a communication system configured to receive weather data corresponding to a worksite, a weather model generation logic configured to generate a weather model based on the weather data, a worksite action identification logic configured to identify a worksite action based on the weather model, and a control signal generator configured to generate a machine control signal that controls a machine associated with the worksite based on the identified worksite action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
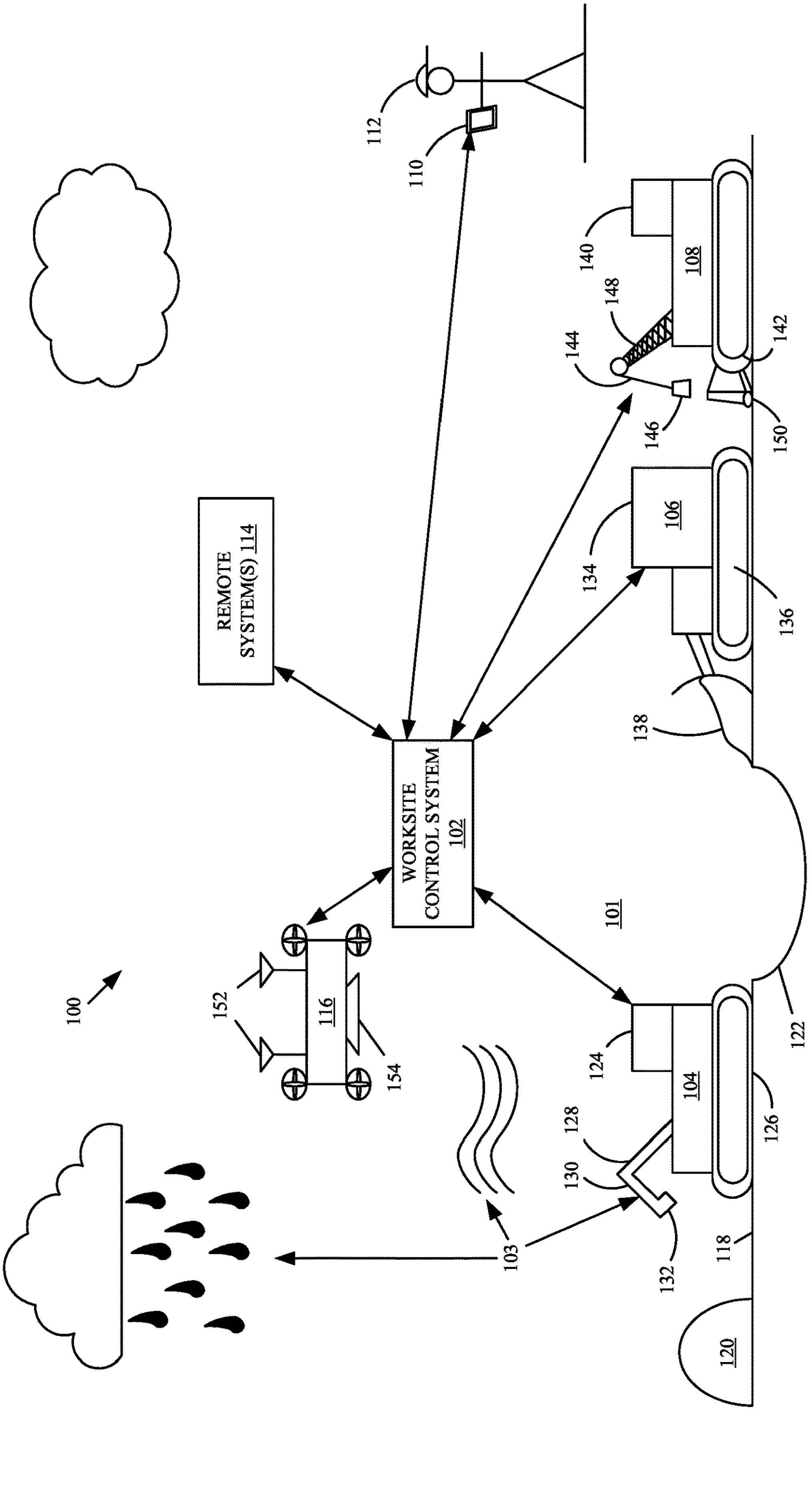
FIG. 1 is a schematic diagram of one example of a worksite architecture.

Mobile work machines include machines that are operated by an operator, automatically, or using combinations of operator inputs and automatic control inputs, to perform operations at a worksite. As noted above, there are a wide variety of different types of mobile work machines, such as construction machines, turf care machines, forestry machines, agricultural machines, among others. For the sake of the present discussion, but not by limitation, examples will be described in the context of mobile construction machine(s) performing construction operations (e.g., worksite preparation, earth-moving operations, operations that move or erect building materials, etc.). Of course, the present systems and features can be utilized in other types of work machine architectures.

In an example construction project, there can be a plurality of different types of work machines at a worksite, and there can be multiple worksites controlled by an offsite manager. The worksite can encounter volatility in weather patterns that can impact site planning and tracking of activities. Most operations at a construction worksite are performed in the open and are thus subject to the variable weather conditions. Also, different weather conditions can impact one or more of machine performance, worksite planning, project tracking, etc. Further, the different weather conditions can impact these in differing ways.

Worksite planning is typically performed by a worksite manager (onsite and/or offsite) and includes the mapping of a worksite, such that all the geographical, grading, and other specific information at a worksite is considered. Many different variables are considered in worksite planning, for example operating costs, machinery usage, and/or personnel or other resource utilization, to name a few. The information can be important for planning the daily operations and/or for long term productivity analysis. Given widely varying types of conditions that can be encountered by a work machine and given a wide range of different types of work machines, the worksite planning can be difficult. For example, the worksite may change due to extreme weather situations, leading to vastly different worksite conditions that can impact day-to-day operations.

For example, extreme cold temperatures can impact fuel consumption (e.g., as a result of machines idling for extended periods of time) which can lead to increased operating costs and/or effect planned start times to ensure that the work machines are properly warmed up before operations. Extreme hot temperatures can impact operator productivity due to fatigue and dehydration. Further, building and road material are often sensitive to temperature fluctuations (e.g., temperature-dependent concrete cure times for optimal strength). Such conditions, among many more, can have an impact on the worksite planning/tracking.

Further, the performance of different work machines can be impacted differently by the varying weather conditions. For example, cranes or excavators that have large or high movable elements (e.g., booms, buckets, etc.) can be affected by high levels of wind leading to instability, but bulldozers might be minimally affected or not affected at all. The use of such information in worksite control, management, and activity tracking can facilitate improved worksite productivity and safety, as well as overall worksite planning and productivity reports/analysis on a granular scale.

FIG. 1 is a diagram of one example of a worksite architecture 100 for a worksite area 101 (or worksite 101) that includes a worksite control system 102 configured to control machines or other systems in architecture 100. Worksite control system 102 is described in further detail below. Briefly, however, system 102 is configured to generate or otherwise obtain a weather model that is based on acquired weather data corresponding to worksite 101. This can include current weather conditions of worksite 101 and/or a future weather forecast for worksite 101. The weather data can identify any of a plurality of different atmospheric states. For example, but not by limitation, the weather data can identify atmospheric temperature (e.g., in degrees Fahrenheit or Celsius), precipitation, pressure, moisture, wind speed, cloud cover, lightning strikes, etc. Using the weather model, system 102 generates control signals to control actions within architecture 100.

Worksite 101 illustrates landscape modifiers 103 that operate to modify certain characteristics of worksite 101. They can include rain, wind, and a plurality of mobile work machines 104, 106, and 108. In the example shown in FIG. 1, worksite 101 also illustratively includes a communication device 110 (such as a mobile device) associated with a user 112, a remote system(s) 114, an unmanned aerial vehicle (UAV) 116 and a worksite surface 118 that includes a pile of material 120, and a hole 122. User 112 can include an operator of one or more of mobile work machines 104, 106, and 108, a worksite manager, or other user.

While mobile work machines 104, 106, and 108 illustratively include an excavator, a dozer, and a crane, respectively, it is to be understood that any combination of mobile machines may be used in accordance with the present description. For example, worksite 101 can also including machines for preparation or care of worksite surface 118, such as, but not limited, water truck(s) that apply water (or other liquid) for dust suppression.

Illustratively, mobile machine 104 is configured to move material from pile of material 120 to worksite surface 118. Work machine 104 includes operator cab 124, tracks (or other ground engaging elements) 126, boom 128, stick/arm 130, and attachment 132. Work machine 106, in one example, is configured to level worksite surface 118. Work machine 106 includes operator cab 134, tracks (or other ground engaging elements) 136 and blade 138. Work machine 108 is configured to move worksite materials, and illustratively includes operator cab 140, tracks (or other ground engaging elements) 142, cable(s) 144, attachment 146, boom 148 and outrigger 150. However, mobile machines 104, 106, and 108 can be configured to carry out any type of work corresponding to a worksite operation.

An unmanned aerial vehicle (UAV) or drone 116 can be used to obtain and transmit worksite data from worksite 101. In one example, the worksite data may include topographical information, a position of mobile machines 104, 106, and 108, or any other information pertaining to worksite 101. UAV 116, as illustratively shown, includes sensor(s) 154 and communication system(s) 152. In one example, sensor(s) 154 can include an image acquisition system configured to acquire image data of worksite 101. Additionally, communication system(s) 152, in one example, allow UAV 116 to communicate with system 102, one or more of mobile machines 104, 106, and 108, and/or remote system(s) 114. In one example, communication system(s) 152 can include a wired or wireless communication system and/or a satellite communication system, a cellular communication system, a near field communication system among many other systems or combinations of systems.

Figure 2A:
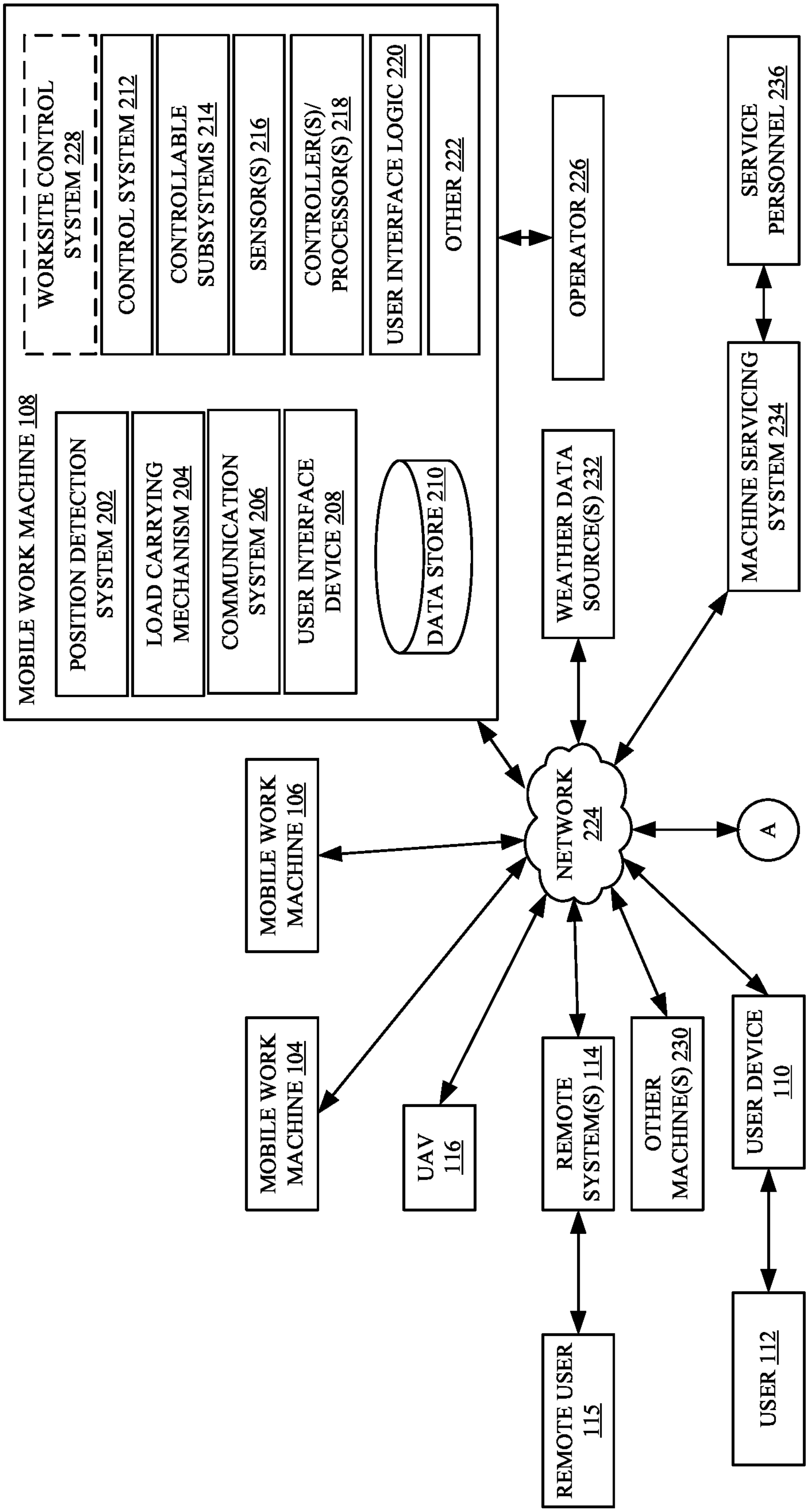
FIGS. 2A and 2B (collectively referred to as FIG. 2) is a block diagram showing one example of the worksite architecture in more detail.
Figure 2B:
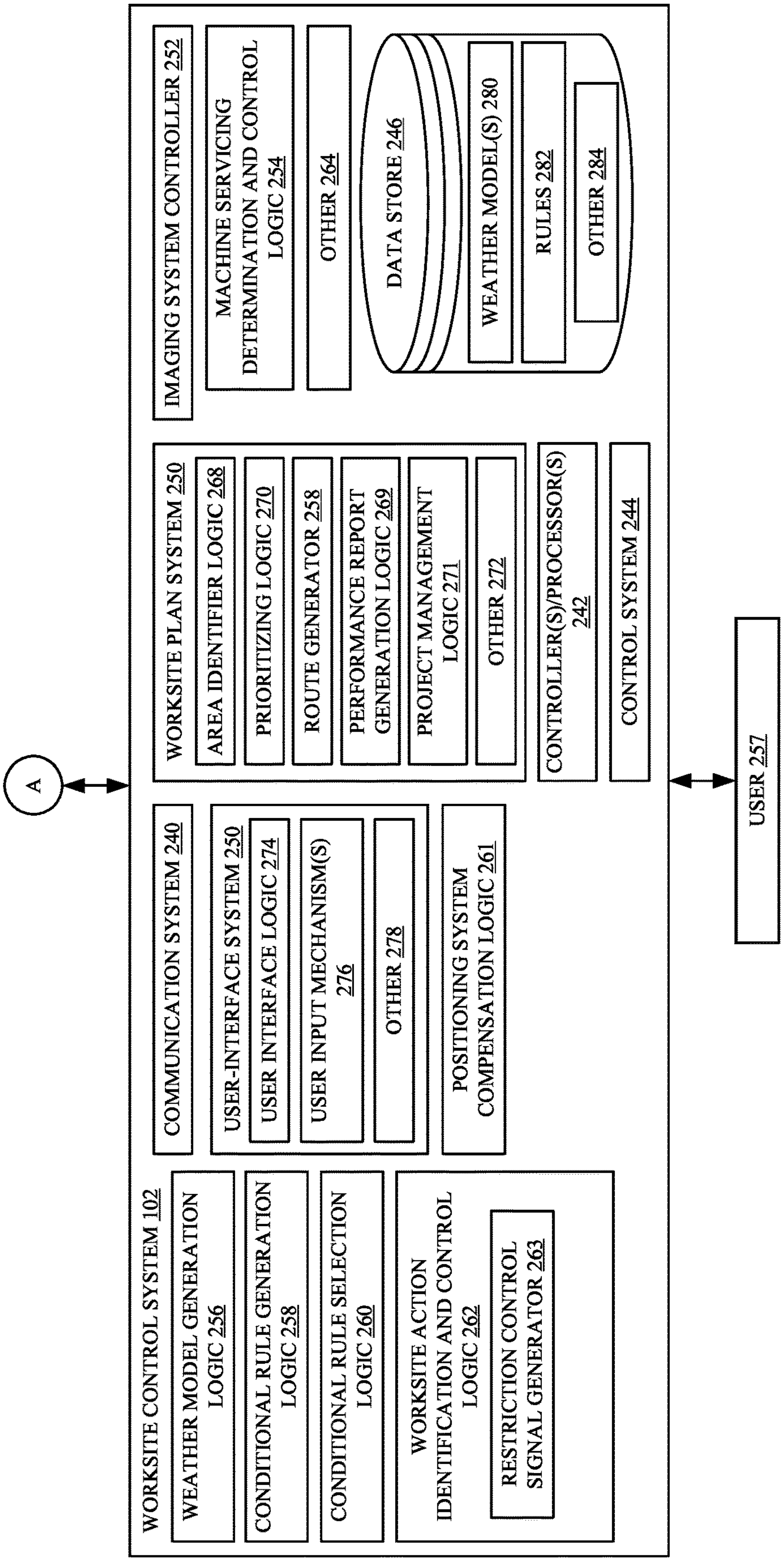

FIGS. 2A and 2B (collectively referred to as FIG. 2) provide a block diagram showing one example of architecture 100. While components of mobile machine 108 are illustrated in FIG. 2, and discussed in further detail below, it is noted that one or more of machines 104 and 106 can include some or all of the same (or similar) features.

Mobile machine 108 is configured to carry out a task in accordance with a worksite operation that, for example, may be leveling a worksite surface, moving material from one worksite area to a different worksite area, among other tasks. Mobile machine 108 illustratively includes a position detection system 202, a load carrying mechanism 204, a communication system 206, a user interface device 208, a data store 210, a control system 212, controllable subsystem(s) 214, sensor(s) 216, one or more processor(s) or controller(s) 218, user interface logic 220, and can include a variety of other logic 222. Control system 212 can generate control signals for controlling a variety of different controllable subsystems 214 based on sensor signals generated by sensor(s) 216, based on instructions from remote system 114 and/or worksite control system 102, based on operator inputs received through user interface device 208, or it can generate control signals in a wide variety of other ways as well. Controllable subsystems 214 can include a wide variety of mechanical, electrical, hydraulic, pneumatic, computer implemented and other systems of mobile machine 108 that relate to the movement of the machine, the operation that is performed, and other controllable features.

Communication system 206 can include one or more communication systems that allow mobile machine 108 to communicate with worksite control system 102, machines 104 and/or 106, remote system 114, UAV 116, and/or other machines at different worksites over network 224. Network 224 can be any of a wide variety of different types of networks, such as a wide area network, a local area network, a near field communication network, a cellular network, or any of a wide variety of other networks or combinations of networks.

Communication system 206 can includes wireless communication logic configured to communicate over network 224 and/or directly with machines 104 and 106. Wireless communication logic can communicate through any of a wide variety of different types of wireless communication protocols. Some examples include, but are not limited, Bluetooth, WiFi, and the like.

A remote user 115 is illustrated as interacting with remote system 114, such as to receive communications from or send communications to work machine 108 through network 224 using communication system 206. For example, but not by limitation, remote user 115 can receive communications, such as notifications, requests for assistance, etc., from work machine 108 on a mobile device.

User interface device 208 can include display devices, mechanical or electrical devices, audio devices, haptic devices, and a variety of other devices. In one example, user interface logic 220 detects user inputs and generates an operator display on user interface device 208 which can include a display device that is integrated into an operator compartment of mobile machine 108, or it can be a separate display on a separate device that can be carried by an operator 226 (such as a laptop computer, a mobile device, etc.).

User interface device 208 includes operator interface mechanism(s), such as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where operator interface mechanism(s) includes speech processing mechanisms, then operator 226 can provide inputs and receive outputs through a microphone and speaker, respectively. Operator interface mechanism(s) can include any of a wide variety of other audio, visual or haptic mechanisms.

Load carrying mechanism 204 is configured to carry or move a load of material during operation of mobile machine 108 at a worksite. Position detection system 202 is configured to detect a position of machine 108 on or relative to worksite 101. System 202 can include one or more of a global position system (GPS) receiver, a LORAN system, a dead reckoning system, a cellular triangulation system, or other positioning system. In one example, position detection system 202 is configured to associate signals obtained by sensor(s) 216 with a geospatial location, such as a location within worksite 101.

Position sensors can include a satellite navigation system receiver configured to receive signals from a set of satellite transmitters. For example, but not by limitation, this can include a Global Navigation Satellite System (GNSS) receiver that receives signals from one or more GNSS satellite transmitters. Position sensor(s) can also include a Real-Time Kinematic (RTK) component that is configured to enhance the precision of position data derived from the GNSS signal from the receiver.

Sensor(s) 216 illustratively sense operational characteristics of machine 108 and/or attributes of worksite 101 over which machine 108 is traveling. For example, sensor(s) 216 can detect a speed and/or heading of machine 108. Further, sensor(s) 216 can sense such things as conditions of worksite surface 118, topography information, a position of mobile machines 104 and/or 106, or any other information relating to a worksite operation. Sensor(s) 216 can thus be a wide variety of different types of sensors such as cameras, infrared cameras or other infrared sensors, video cameras, stereo cameras, LIDAR sensors, structured light systems, etc.

Sensor control logic can control sensor(s) 216. Therefore, it can illustratively control when sensor readings are taken, and it can perform signal conditioning on the sensor signals, such as linearization, normalization, amplification, etc. It can also illustratively perform other processing on the signals, or the processing can be performed by worksite control system 102, or the processing can be split between machine 108 and worksite control system 102. As represented in FIG. 2 at block 228, mobile work machine 108 can include one or more of the components of worksite control system 102, discussed below. Accordingly, some or all of the processing and control performed by worksite control system 102 can be performed by machine 108.

In the example illustrated in FIG. 2, worksite control system 102 and/or mobile work machine 108 can communicate with one or more of user device 110, other machine(s) 230, weather data source(s) 232 and machine servicing system 234. Machine 230 can include a wide variety of different types of machines configured to perform a worksite operation. For example, machine 230 performs a worksite preparation or care operation to assist machines 104, 106, and/or 108. One example of machine 230 is a water truck configured to spray water or another liquid to worksite surface 118 for dust suppression.

Weather data source(s) 232 are configured to provide weather data for user by worksite control system 102. This is discussed in further detail below. It is noted that sources 232 can include any of a wide variety of different types of data sources that are local to, or remote from, system 102.

An example of machine servicing system 234 is configured to provide or otherwise facilitate servicing of mobile work machines. A service personnel 236 is shown interacting with machine servicing system 234. Service personnel 236 is, for example, a service technician that is dispatched to service mobile work machine(s) 104, 106 and/or 108, for example to repair or replace machine parts, or otherwise perform machine servicing operations on those machines. For sake of illustration, but not by limitation, worksite control system 102 can send communications through network 224 to machine servicing system 234 indicating that an air filter on mobile work machine 108 requires replacement or will require replacement at a future time.

Worksite control system 102 includes communication system 240, controller(s)/processor(s) 242, a control system 244, a data store 246, a worksite planning system 248, a user interface system 250, and an imaging system controller 252. System 102 also is illustrated as including machine servicing determination and control logic 254, weather model generation logic 256, conditional rule generation logic 258, conditional rule selection logic 260, worksite action identification, control logic 262, and positioning system compensation logic 261. System 102 can include other items as well. This is represented by block 264.

Positioning system compensation logic 261 is configured to identify an impact of the weather conditions on the positioning information generated by position detection system 202, and to perform compensation based on the identified impact. For example, high humidity conditions or an approaching thunderstorm can cause substantial noise that impacts RTK-GPS systems. Logic 261 can thus identify this potential impact and/or compensate for the impact to correct the positioning information generated by system 202.

Worksite planning system 248, in one example, is configured to generate worksite planning information representing machine operations to be performed on worksite 101. This can include, but is not limited to, an order or machine operations, a timeframe of the machine operations, etc., for various stages or phases of the worksite project. Accordingly, system 248 can include a route generator 266 configured to generate route(s) for the various mobile work machines, within worksite 101, based on identified types and locations of worksite areas within worksite 101. Types of worksite areas within worksite 101 can be identified based on a position of landscape modifiers within the worksite. For example, area identifier logic 268 can receive an input from position detection system 202 of mobile work machine 104, and can identify a geospatial location of machine 104 within worksite 101 based on the received input. Based on the location, and other landscape modifiers, logic 268 can identify different locations and types of worksite areas.

Based on the identified types and locations of the worksite areas within a worksite, prioritizing logic 270 can prioritize the worksite areas and/or order of operations of the machines on the worksite, to complete the project. In one example, this is based on weather information. This is discussed in further detail below. Worksite planning system 248 can include other items 272 as well.

User interface system 250 includes user interface logic 274 configured to generate user interfaces with user input mechanisms 276 for interaction by a user 257. Through these user input mechanisms 276, user 257 can define and/or modify various operating parameters of worksite control system 102, such as worksite planning system 248, weather model generation logic 256, conditional rule generation logic 258, conditional rule selection logic 260, and/or worksite action identification and control logic 262. Also, user 257 can interact with imaging system controller 252 to control an imaging system to acquire images of worksite 101 and/or logic 254 to interact with machine servicing system 234. User 257 can view various worksite performance reports and control the various machines, systems, and components of architecture 100, including sending notifications, messages, and/or control instructions to those machines, systems, and/or components. User interface system 250 can include other items 278 as well.

Weather model generation logic 256 is configured to generate a weather model that models atmospheric states or conditions relative to worksite 101. In one example, logic 256 generates a weather model for worksite 101 based on data received from weather data source(s) 232. The weather model can be stored in data store 246, as represented by block 280. A weather model can model one or more different atmospheric states for a given time period. This can include the current weather conditions, and/or future forecasted weather conditions.

Conditional rule generation logic 258 is configured to generate conditional rules that map weather conditions or atmospheric states to corresponding actions or operations to be performed within architecture 100. This is discussed in further detail below. Briefly, however, an example conditional rule maps an input or triggering condition, such as windspeed above a threshold (e.g., thirty miles per hour (MPH)), to a corresponding machine action that sets a restriction control on the machine. In one particular example in the case of a crane, a conditional rule can map windspeeds above the threshold to a restriction control that restricts vertical movement of the boom, so that it cannot be raised by the operator above a specified height. In another example, a conditional rule maps a threshold temperature (e.g., below zero degrees Fahrenheit) to a control action that automatically idles the machine(s). Illustratively, this rule ensures that the machine is left idling in extreme cold conditions overnight, to ensure that the engine will startup/run the next morning. Further yet, another example conditional rule maps prolonged dry periods with little or no precipitation to a control action that sends a control instruction to a water truck to apply water to the worksite surface for dust suppression. These, of course, are by way of example only.

In any case, the conditional rules can be stored in data store 246, as represented at block 282. Of course, data store 246 can store other data items 284 as well.

Logic 260 is configured to select one or more conditional rules based on the weather model generated for worksite 101. Based on this selected conditional rule, worksite action identification and control logic 262 identifies one or more corresponding worksite actions. Logic 262, either directly and/or using control system 244, generates control instructions to perform those worksite actions. This can take a wide variety of different forms. In one example, the worksite action is a control signal that controls one or more of the mobile work machines 104, 106, and 108 to perform commanded movements. In another example, the action is a restriction control that restricts control of the machine(s). In another example, the action control is communication system 240 to send messages, control instructions or other communications to work machines 104, 106, and/or 108, user device 110, remote system 114, other machines 230, and/or machine servicing system 234.

Figure 3:
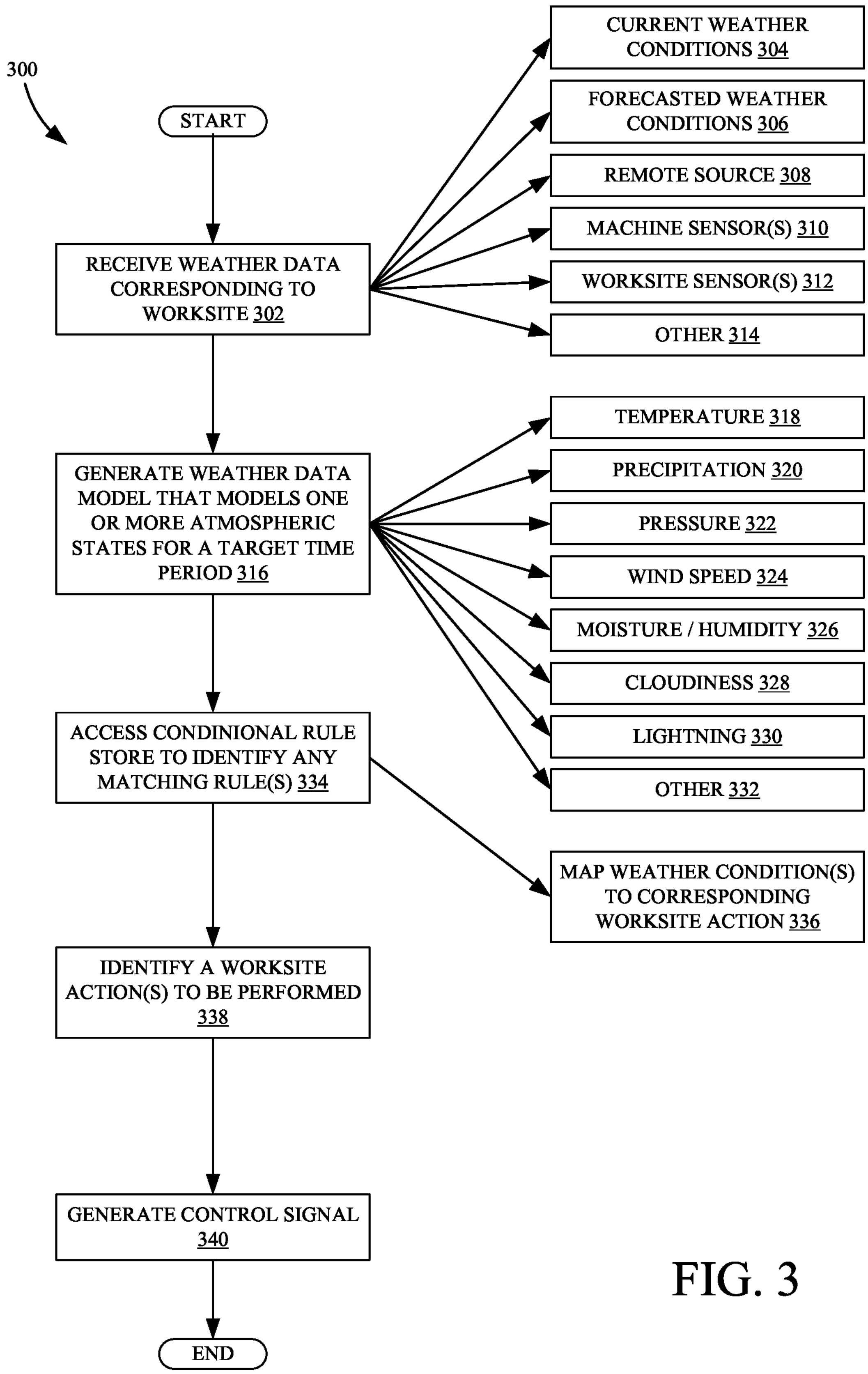
FIG. 3 is a block diagram of one example of a worksite control system.

FIG. 3 is a flow diagram 300 for mobile work machine control using a weather-based model. For sake of illustration, but not by limitation, FIG. 3 will be described in the context of architecture 100 described above with respect to FIGS. 1, 2A, and 2B.

At block 302, weather data corresponding to worksite 100 is received. As noted above, the weather data can be indicative of current weather conditions 304 at worksite 101 and/or future forecasted weather conditions 306. Further, the weather data can be received from a wide variety of different sources including, but not limited to, a remote source 308, machine sensor(s) 310, worksite sensor(s) 312, or in other ways, which is represented by block 314. An example of remote source 308 includes weather data source 232. Machine sensor 310 can include sensors 216. Worksite sensor 312 can include sensors positioned about worksite 101 to sense various atmospheric states such as temperature, precipitation, air pressure, wind speed, humidity, etc.

At block 316, logic 256 generates a weather data model that models one or more of the atmospheric states for a target time period. The target time period can be defined in any of a number of ways. For instance, the target time period can represent a current time, so that the system utilizes an instantaneous weather state for worksite control. In another example, the target time period can define a future time period, such as several hours in the future, the next day, the next week, the next month, etc.

Any number of different atmospheric states can be modeled by the weather data model. This includes, but is not limited to, temperature 318, precipitation 320, barometric pressure 322, wind speed 324, air moisture or humidity 326, cloudiness 328, the occurrence of lightning strikes 330 in a vicinity of worksite 101, or any other states 332.

At block 334, a conditional rule store is accessed to identify any matching conditional rules based on the weather data model generated at block 316. In one example, this includes logic 260 accessing rules 282 in data store 246. A matching conditional rule maps weather condition(s) in the weather data model to a corresponding worksite action. This is represented at block 336. For example, assume the weather data model generate at block 316 indicates that the high temperature at worksite 101 for the current day is ninety degrees Fahrenheit with wind speeds of twenty to thirty miles per hour. In this case, a conditional rule identified at block 334 can map an input wind speeds greater than twenty miles per hour to a restricted control action that prevents the boom of a crane on worksite 101 from being lifted above forty feet (or other threshold constraint). Another matching rule, identified at block 334, can trigger a control action that instructs a watering truck to apply water to the worksite for dust suppression.

In another example, assume that the weather data model generated at block 302 indicates that it has been raining for the past three hours. A conditional rule identified at block can include a restricted control action that prevents machine wheel or track speed from exceeding ten miles per hour, to prevent the wheels/tracks from slipping and becoming stuck. These, of course, are for sake of illustration only.

At block 338, the worksite action(s) corresponding to the matching rules are identified. At block 340, control signals are generated to control the corresponding machines, devices, systems, etc., in architecture 100 to perform the worksite actions identified at block 338.

In one example, the operations shown in FIG. 3 are performed in conjunction with continuous (e.g., real-time) updating of the weather model. In this case, as long as machine 108 is being used, system 102 receives real-time updates to current weather conditions, and communicates with control system 212, in real-time, to control actions taken by machine 108. Thus, control system 102 can respond to instantaneous changes in the weather conditions (e.g., wind gusts, etc.) to perform corresponding control of machine 108.

Figure 4:
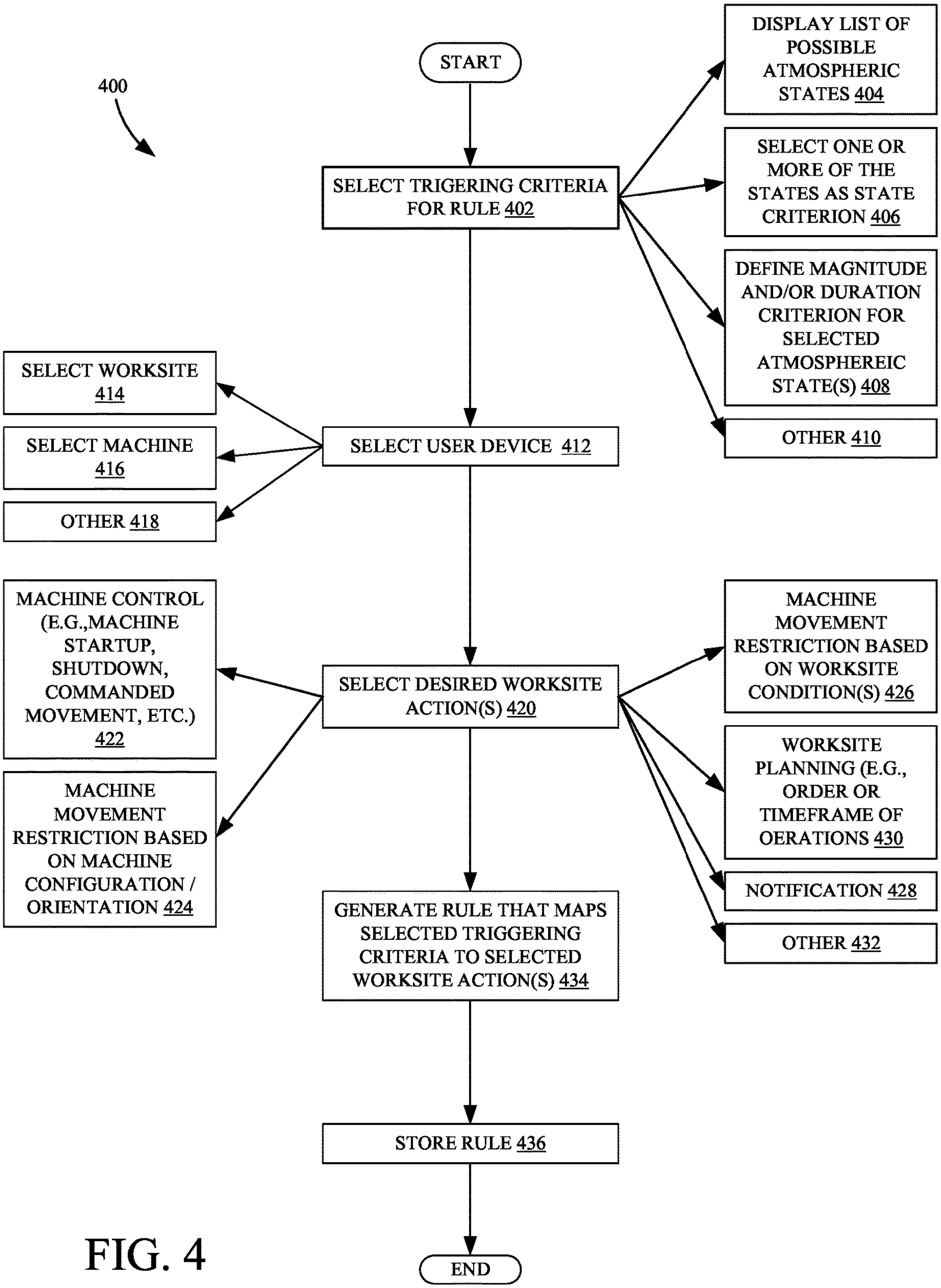
FIG. 4 is a flow diagram illustrating one example of conditional rule generation.

FIG. 4 is a flow diagram 400 illustrating one example of conditional rule generation. For sake of illustration, but not by limitation, FIG. 4 will be described in the context of conditional rule generation logic 258 in architecture 100.

At block 402, triggering criteria (or criterion) is selected for the conditional rule to be generated. The triggering criteria represents a target weather condition for which the conditional rule is to be triggered to generate a corresponding worksite action. In one example, a list of possible atmospheric states is displayed to a user at block 404. A user input (e.g., by user 257 through user input mechanisms 276) is received that selects one or more of the atmospheric states as state criterion for the rule. This is represented at block 406. In one example, user 257 selects wind speed as an atmospheric state criterion for the conditional rule being generated.

At block 408, magnitude and/or duration criterion is defined for the selected atmospheric state criterion. In the above example, user 257, through user input mechanisms 276, defines a threshold magnitude and/or duration for the wind speed, for which the conditional rule is to be triggered. For instance, user 257 can define a threshold wind speed of thirty miles per hour for triggering the conditional rule. In another example, the criterion defined at block 408 can define a threshold level or duration of rain for which the conditional rule is triggered. Of course, the triggering criterion can be selected at block 402 in other ways as well. This is represented at block 410.

At block 412, a target machine or machines can be selected for the rule. In one example, this can include user 257 selecting worksite 101. In another example, user 257 can select a plurality of different worksites for which the rule is to be applied. This is represented at block 414.

At block 416, one or more machines are selected. For example, user 257 provides input through user input mechanism 276 that selects one or more of machines 104, 106, and/or 108 on worksite 101, as a target for the conditional rule. Accordingly, a conditional rule can be specific to all machines on a particular worksite, or a subset of those machines (e.g., one specific machine or type of machine).

The target can be selected at block 412 in other ways as well. This is represented at block 418. At block 420, the desired worksite action(s) are selected for the conditional rule. This can be done in any of a number of ways. Further, this can include one worksite action, or many worksite actions, that are to be triggered in response to detection of the triggering criteria for the rule.

In one example, a worksite action can be a machine control action that controls the machine to perform a commanded movement or operation. This is represented at block 422. For example, block 422 can include a startup instruction that starts up machine 108, a shutdown instruction that shuts off machine 108, or a commanded movement instruction that commands work machine 108 to move one or more controllable subsystems 214. In one example, an imaging system (e.g., UAV 116) is controlled to acquire images of areas of worksite 101. For instance, UAV 116 (or other imaging system) can be controlled to acquire a first set of images of the worksite before a rainstorm and a second set of images after the rainstorm. These sets of images can then be compared, automatically through image processing and/or manually, to identify areas of the worksite 101 that were affected by rainfall (e.g., flooding, changes in piles of material, filling of troughs, grading changes, etc.

Further, block 422 can include controlling machine 108 to change a steering angle relative to a slope angle, change a position of a movable element, reduce a load on machine 108, change a travel speed, among a wide variety of other changes or adjustments to automatically or semi-automatically control machine 108 to avoid an unstable state.

A worksite action can also include a movement restriction that is based on a machine operating configuration or orientation (block 424) or based on worksite condition(s) (block 426). For instance, a worksite action at block 424 can restrict raising a boom or other implement of the machine at a certain height if the machine is oriented a certain direction with respect to the wind direction. The machine configuration/orientation can be based on a stability detection and control system implemented by machine 106, or by another component of architecture 100.

An example of stability detection and control predicts controllable adjustments during machine operation, and detect scenarios that are likely to occur and render the machine unstable. For instance, this can be based on a center of gravity that takes into account machine loading, worksite topology, etc. The stability detection and control can also generate a measure indicative of a likelihood of encountering an unstable state at each of a number of predicted positions. This provides a robust stability control system that strategically restricts control to avoid unstable states during an operation. As such, the stability detection and control system prevents hazards situations where machine 108 tips over, before they occur, thereby improving performance.

The machine movement restriction at block 246 can be based on worksite conditions such as soil saturation, worksite topology, obstacles detected on worksite 101, etc. For instance, the desired worksite action selected at block 420 can specify that the boom of a crane is not to be raised above a threshold height when wind conditions are above thirty miles per hour and the crane is on an area of worksite 100 having a slope greater than five degrees.

A restriction control signal generator 263 is configured to generate a restriction control signal that restricts control of machine 108 to avoid encountering an unstable state. It generates a restriction control signal based on the actions defined in the conditional rule(s). For instance, a restriction control signal prevents generation of the control signals that were defined for restriction by a triggered rule, thereby preventing employment of machine 108 with subsystem configurations, operating parameters, orientations, loads, or other operating characteristics identified as strong contributors to likely instability or negative impact by the current weather state. The restriction control signal can restrict generation of a single control signal (e.g., it can prevent the operator from raising the bucket beyond a certain height) and/or multiple sets or groups of control signals (e.g., it can restrict the operator from raising the bucket beyond a certain height and from turning at a steep turning angle while traveling above a certain speed). Restriction control signal generator 263 generates an output indicative of the restriction control signal, that is provided to machine 108, for example to restrict generation of the control signals that would otherwise be generated by control system 212. As such, control system 212 is restricted to only generate some of the possible control signals that are otherwise available.

The worksite action can also include a notification sent to a mobile work machine 104, 106, and/or 108, user device 110, remote system 114, and/or machine servicing system 234. This is represented at block 428. For example, the notification can correspond to worksite planning information generated by system 248, which defines an order or timeline of various worksite operations to be performed by the mobile work machines. This notification can be sent to user device 110 for user 112 to coordinate the operations on worksite 101. For example, in response to detection that rain is likely later in the day, so a bulldozing operation should be performed earlier in the day, and therefore prioritized before other operations that are less likely to be affected by the rainfall. This is represented at block 430.

In another example, a notification can be sent to machine servicing system 234 indicating that machine 108 requires, or will require, servicing. For instance, the notification indicates an air filter of mobile work machine 108 is to be replaced in response to detection of prolonged periods of dry and windy conditions that are likely to result in clogging of the air filter.

Of course, other desired worksite actions can be selected as well. This is represented at block 432.

At block 434, the conditional rule is generated that maps the selected triggering criteria to the selected worksite action(s). In one example, a data record is generated having any suitable data structure for storing and retrieval of this information. For instance, the data structure can include a table structure will fields that store a machine identifier that identifies the particular machine, a worksite identifier that identifies the worksite, the triggering criterion for the rule, operation identifier(s) that identifies operation(s) to be controlled when the rule fires, a time period when the rule is active, or any other information. At block 436, the rule is stored, for example in data store 246.

Figure 5:
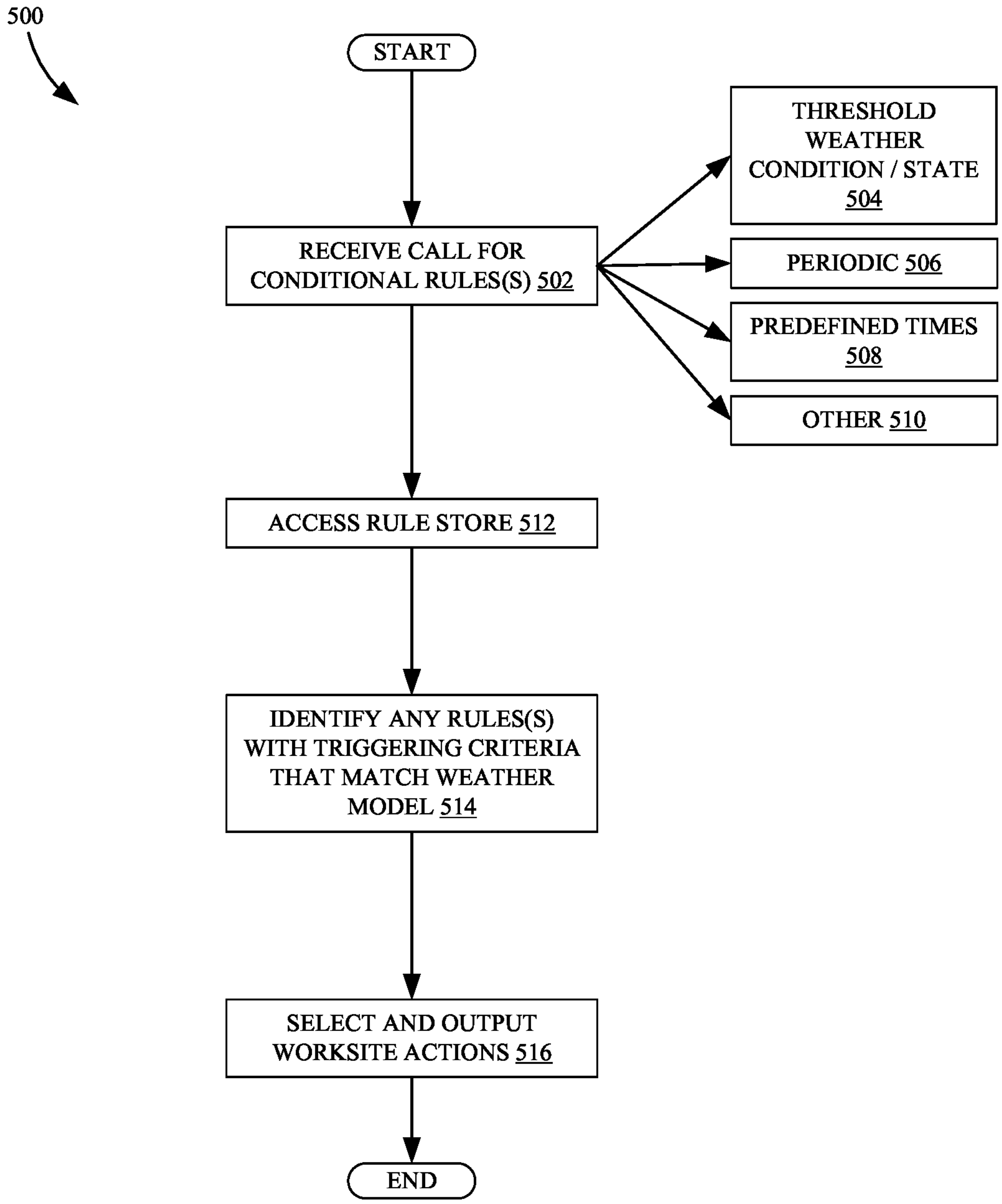
FIG. 5 is a flow diagram illustrating an example operation of conditional rule selection.

FIG. 5 is a flow diagram 500 illustrating an example operation of conditional rule selection. For sake of illustration, but not by limitation, FIG. 5 will be discussed in the context of logic 260 in architecture 100.

At block 502, a call for conditional rule(s) is received. The call can be in response to any number of criteria. For example, the call can be generated for rule selection in response to detection of a threshold weather condition or state. This is represented at block 504. For example, the threshold weather condition or state can represent extreme weather conditions or patterns for which worksite control instructions are to be generated. The call for conditional rules can be periodic (block 506), at pre-defined times (block 508), or based on other criteria (block 510). For example, conditional rules can be identified at the beginning of the workday for the expected weather conditions for that day.

At block 512, a rule store (rules 282) are accessed to identify any rules with triggering criteria at block 514. For example, block 514 access the data fields of the stored rules to identify all rules that are to fire when the windspeed is above twenty miles per hour. At block 516, the corresponding worksite actions for the identified rules (that have triggering criteria that match or otherwise correspond to the weather model) are selected and output by logic 262.

Also, it is noted that the weather model can be utilized for worksite planning and productivity tracking. Worksite productivity can be tracked alongside weather conditions on a granular scale. For example, cold temperatures can impact overall fuel consumption by machines on the worksite even when the machines are inactive because the machines are left idling in extreme cold conditions to ensure the engines start the next morning. This fuel consumption is a measurable productivity marker. Also, hot and dry weather can cause the formation of dry dust which can clog filters, impact the elasticity of seals and sealants, and can overall reduce the performance of the machine operators. Worksite planning system 248 includes performance report generation logic 269 that is configured to aggregate wind, temperature, humidity, and/or other atmospheric states with work machine productivity variables and to calculate the effect of such conditions on user and machine productivity. This can be further utilized in project management processes performed by project management logic 271. Project management logic 271 is configured to utilize historical weather data and worksite performance information. This information can be utilized, for example, by a project manager in a bidding process for a work project and to increase accuracy in the tracking of progress on the work project.

Figure 6:
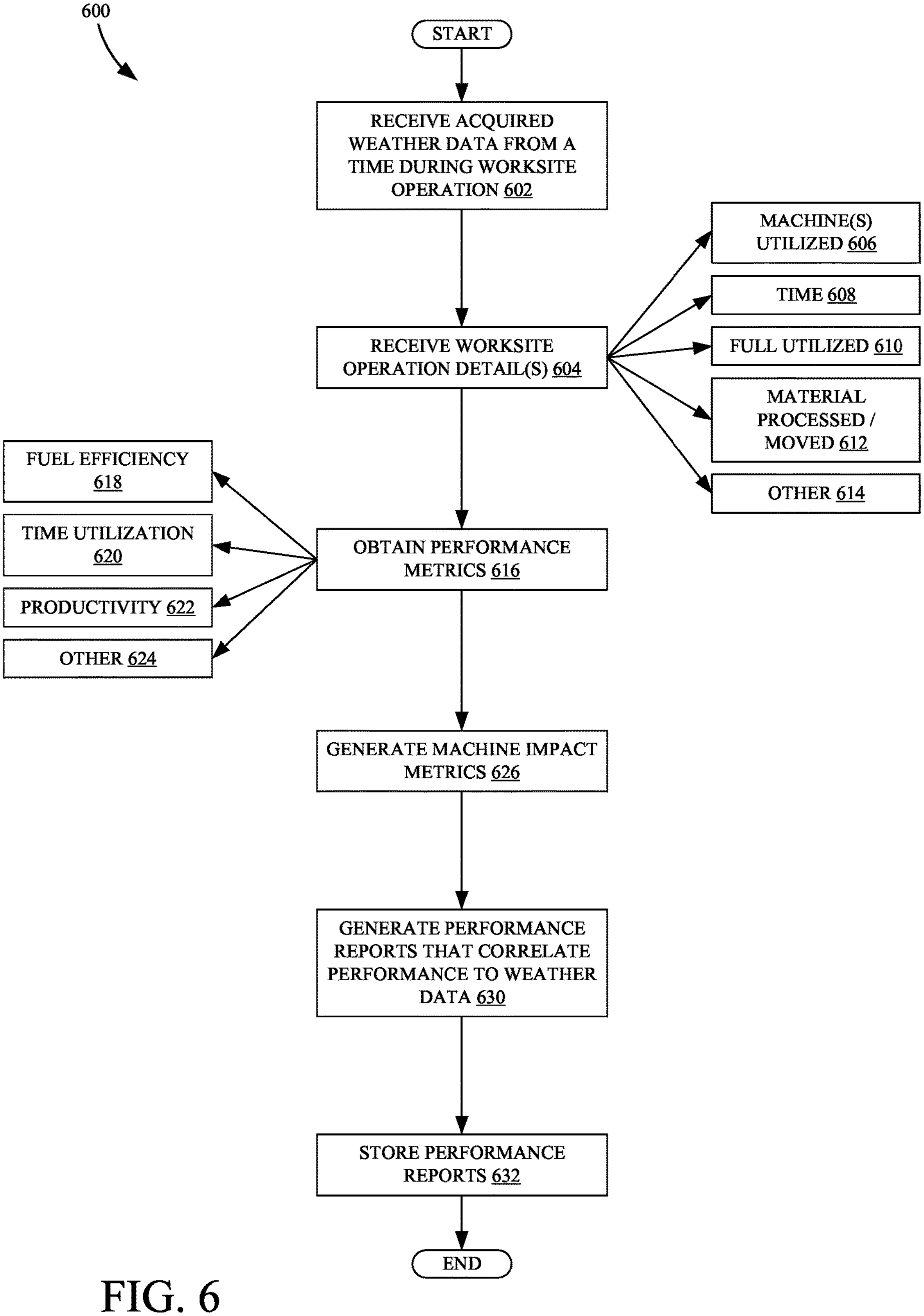
FIG. 6 is a flow diagram illustrating an example generation of worksite performance reports.

FIG. 6 is a flow diagram 600 illustrating an example generation of performance reports. For sake of illustration, but not by limitation, FIG. 6 will be discussed in the context of logic 269 in architecture 100.

At block 602, weather data is received from a time during a given worksite operation. For instance, this time period can comprise some or all of machines 104, 106, 108 on worksite 101 to complete the overall worksite operation.

At block 604, details of the worksite operations are received. This can include any of a number of different types of information. For instance, this can include an identification of the various work machines that were utilized on the worksite (block 606), a time that each of the machines were utilized (block 608), fuel consumption information pertaining to those machines (block 610), material that was moved or otherwise processed (block 612), and can include other information (block 614) as well.

At block 616, performance metrics are generated or otherwise obtained based on the worksite operations. For example, this can include performance metrics indicative of fuel efficiency (block 618), time utilization (block 620), productivity (block 622), or other performance metrics (block 624).

At block 626, machine impact metrics can be generated, indicating an impact of the worksite operations taking into account the weather data. For instance, if a bulldozer is operated for an extended period of time in dry windy conditions, a machine impact metric can indicate that a high load has been placed on the various components and subsystems of that machine due to those conditions.

At block 630, performance reports are generated that correlate the performance metrics to the weather data. For instance, the performance reports can indicate that productivity during cold and rainy periods was reduced by a certain percentage and required an additional couple hours of time utilization of the machine. Also, the reports can indicate whether an operator was properly warming up the machines in cold weather. The performance reports are stored at block 632.

Figure 7:
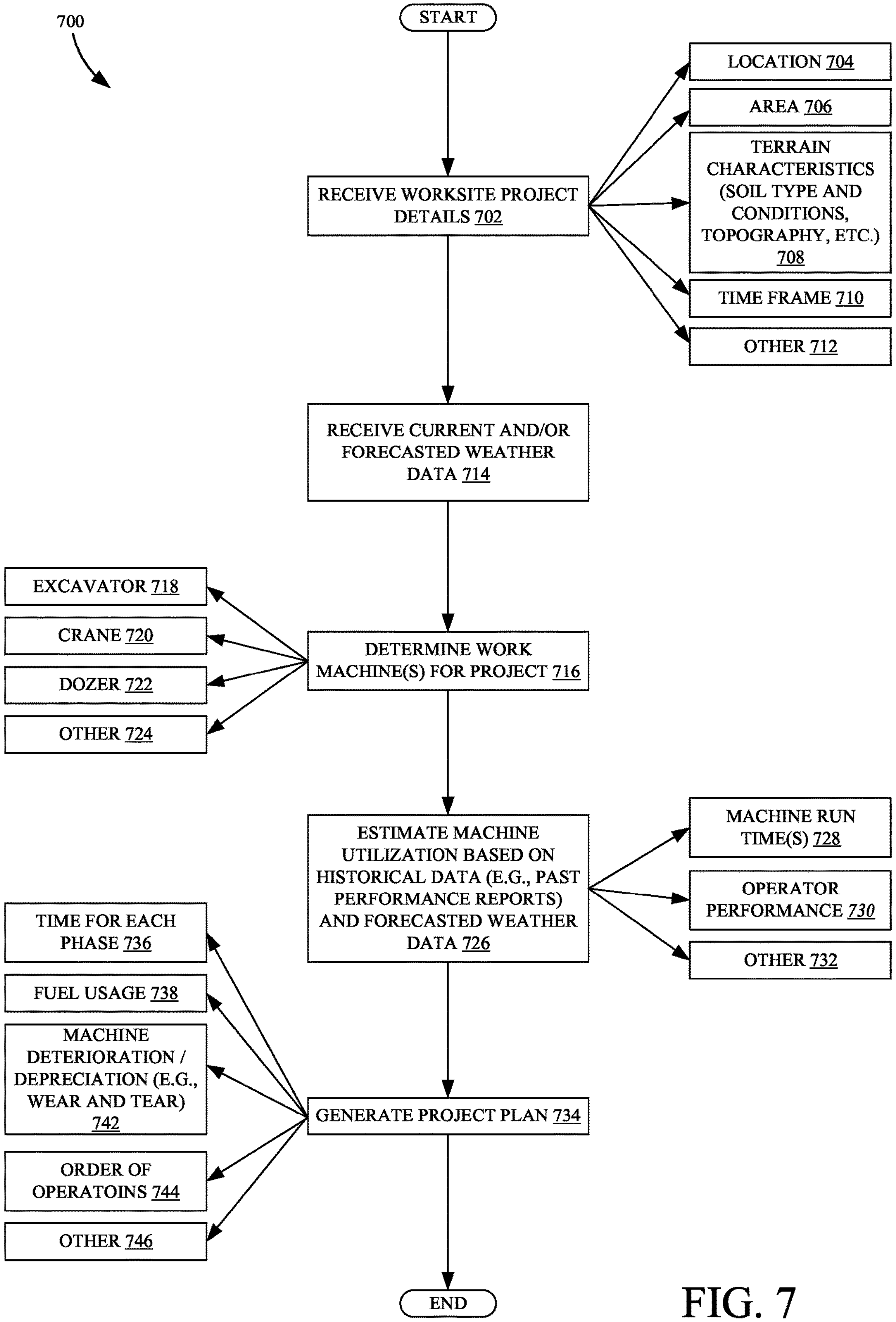
FIG. 7 is a flow diagram illustrating one example of worksite project planning and management.

FIG. 7 is a flow diagram 700 illustrating one example of project planning and management control using prior weather conditions and performance reports. For sake of illustration, but not by limitation, the operations shown in FIG. 7 are performed by system 248 in association with a project bidding process using project management logic 271.

At block 702, worksite project details are received for a given worksite project. This can include location information (block 704), worksite area information (block 706), terrain characteristics (block 708), timeframe information for the project (block 710), and can include other information (block 712) as well.

At block 714, forecasted weather data is received corresponding to the worksite project. At block 716, the work machines to be utilized during the worksite project are determined. This can include an excavator 718, a crane 720, a bulldozer 722, and/or other machines 724.

At block 726, machine utilization is estimated based on historical data, such as past performance reports, and the forecasted weather data. This can include estimating the machine runtimes 728, expected operator performance metrics (block 730), or other machine utilization data 732 based on the forecasted weather data.

At block 734, a project plan is generated having a number of project criteria. For example, the project plan can identify an estimated time for each phase of the project. This is represented at block 736. For instance, this can indicate the amount of time that excavator 718 will take to complete an excavation phase of the project, given the worksite project details at block 702, and the forecasted weather data 714, taking into account the historical data at block 726. For sake of illustration, time 736 may be increased if the past performance reports indicate that excavation operations take longer during rainy time periods, and the forecasted weather data indicates periods of rainy conditions during the work project.

Also, the project can indicate an estimated fuel usage 738 by the machines, and estimated machine deterioration (e.g., wear and tear), an order of the operations 744, and can include other items 746 as well. The order of operations at block 744 can indicate when the various phases of the project should be performed based on the weather data. For instance, logic 271 can prioritize the various stages of the worksite project based on the weather data. Operations that are more likely to be affected by rainy conditions are prioritized to occur during dry periods. Similarly, operations that are more likely to be affected by windy conditions are prioritized to occur during calm periods, or periods of the lowest expected wind speed. This information can be output to device 110 and/or machine(s) 104,106,108.

It can thus be seen that the present system provides a number of advantages. For example, but not by limitation, the present control system can generate worksite control signals to control various aspects of worksite based on a weather model that models various atmospheric states. The control signals can be utilized to improve machine performance, reduce the occurrence of unstable or dangerous machine operations or states, etc.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGURES show a number of blocks with functionality ascribed to each block. It will be noted that fewer blocks can be used so the functionality is performed by fewer components. Also, more blocks can be used with the functionality distributed among more components.

Figure 8:
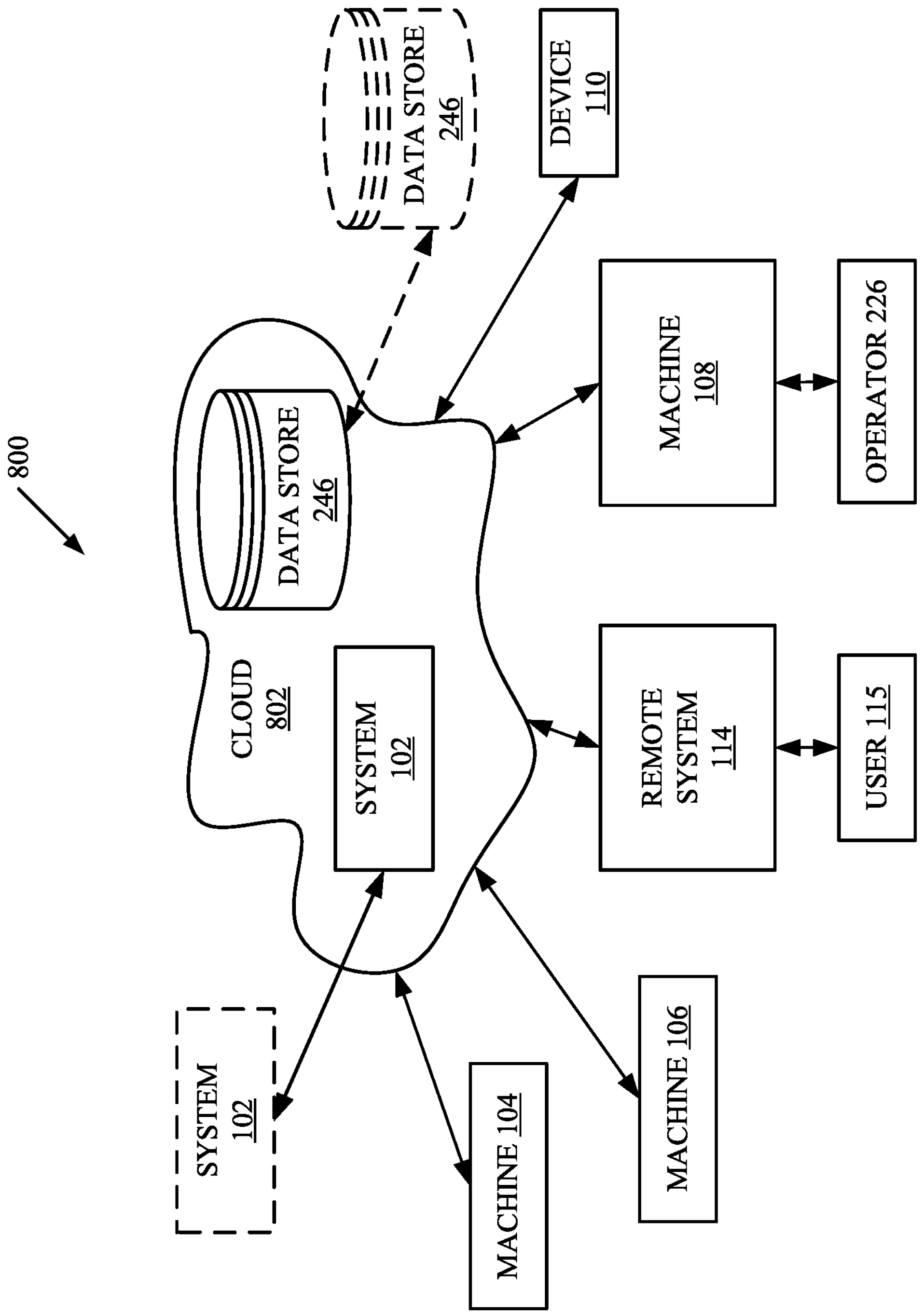
FIG. 8 is a block diagram showing one example of the architecture illustrated in FIG. 1, deployed in a remote server architecture.

FIG. 8 is a block diagram showing one example of the architecture illustrated in FIG. 2, deployed in a remote server architecture 800. In an example embodiment, remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 8, some items are similar to those shown in FIG. 2 and they are similarly numbered. FIG. 8 specifically shows that a plurality of work machines 104-108 can be used. Also, worksite control system 102 can be located at a remote server location 802. Therefore, work machines 104-108 accesses those systems through remote server location 802.

FIG. 8 also depicts another embodiment of a remote server architecture. FIG. 8 shows that it is also contemplated that some elements of FIG. 2 are disposed at remote server location 802 while others are not. By way of example, data store 246 can be disposed at a location separate from location 802 and accessed through the remote server at location 802. Further, system can be disposed at a location separate from location 802 and accessed through the remote server at location 802. Regardless of where they are located, they can be accessed directly by work machines 104-108, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the work machine comes close to the fuel truck for fueling, the system automatically collects the information from the work machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
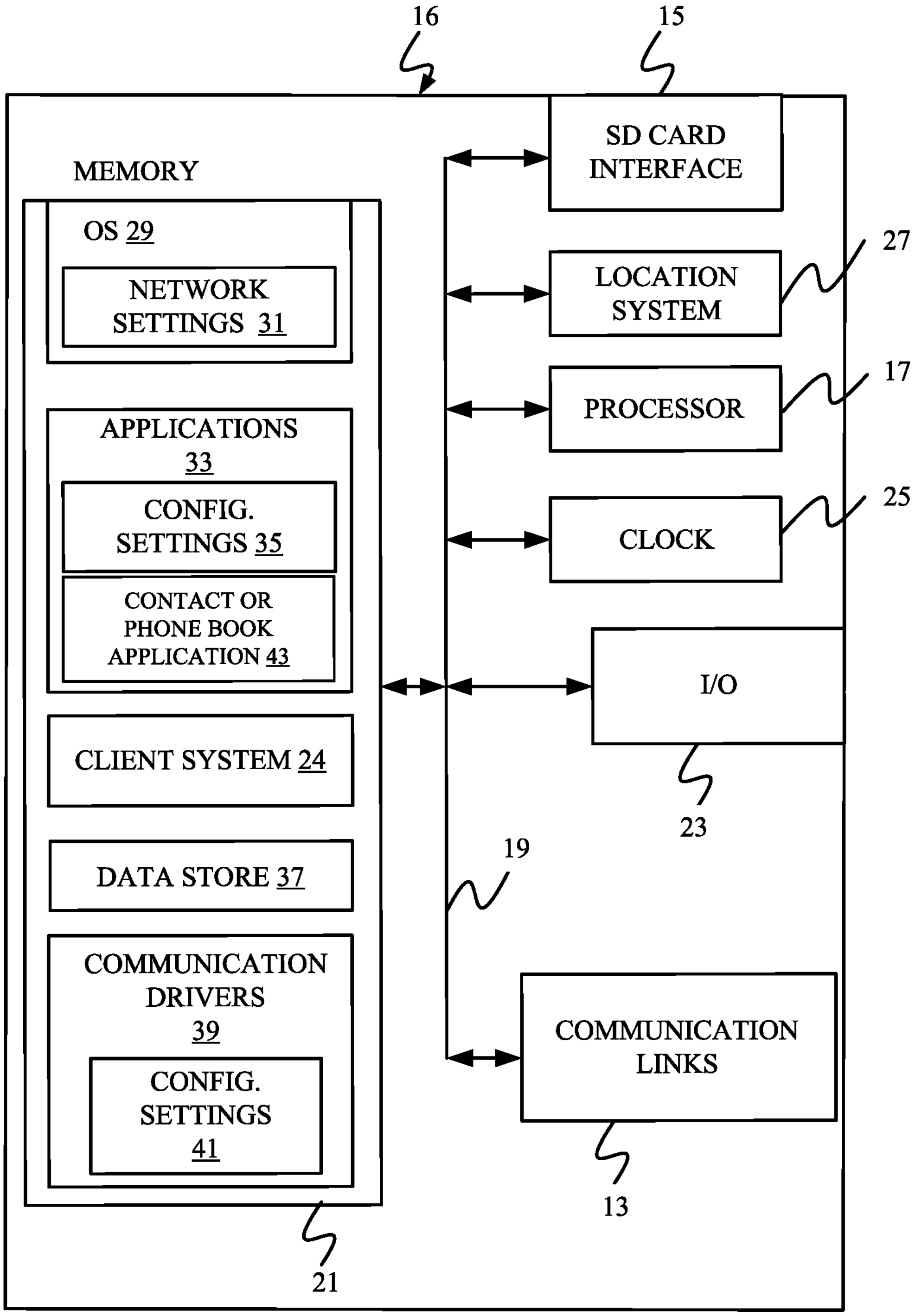
FIGS. 9-11 show examples of mobile devices that can be used in the architectures shown in the previous FIGURES.
Figure 10:
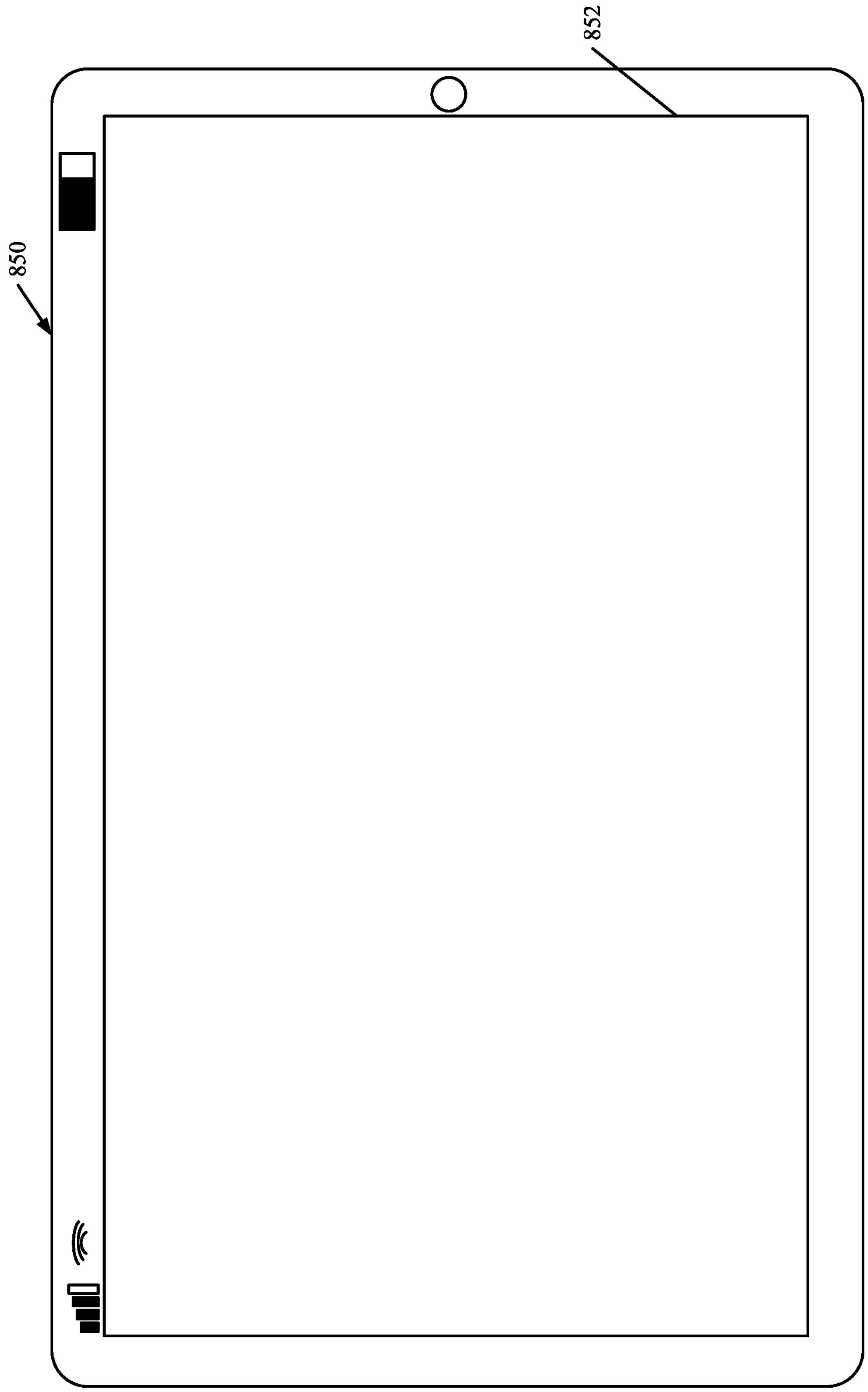
Figure 11:
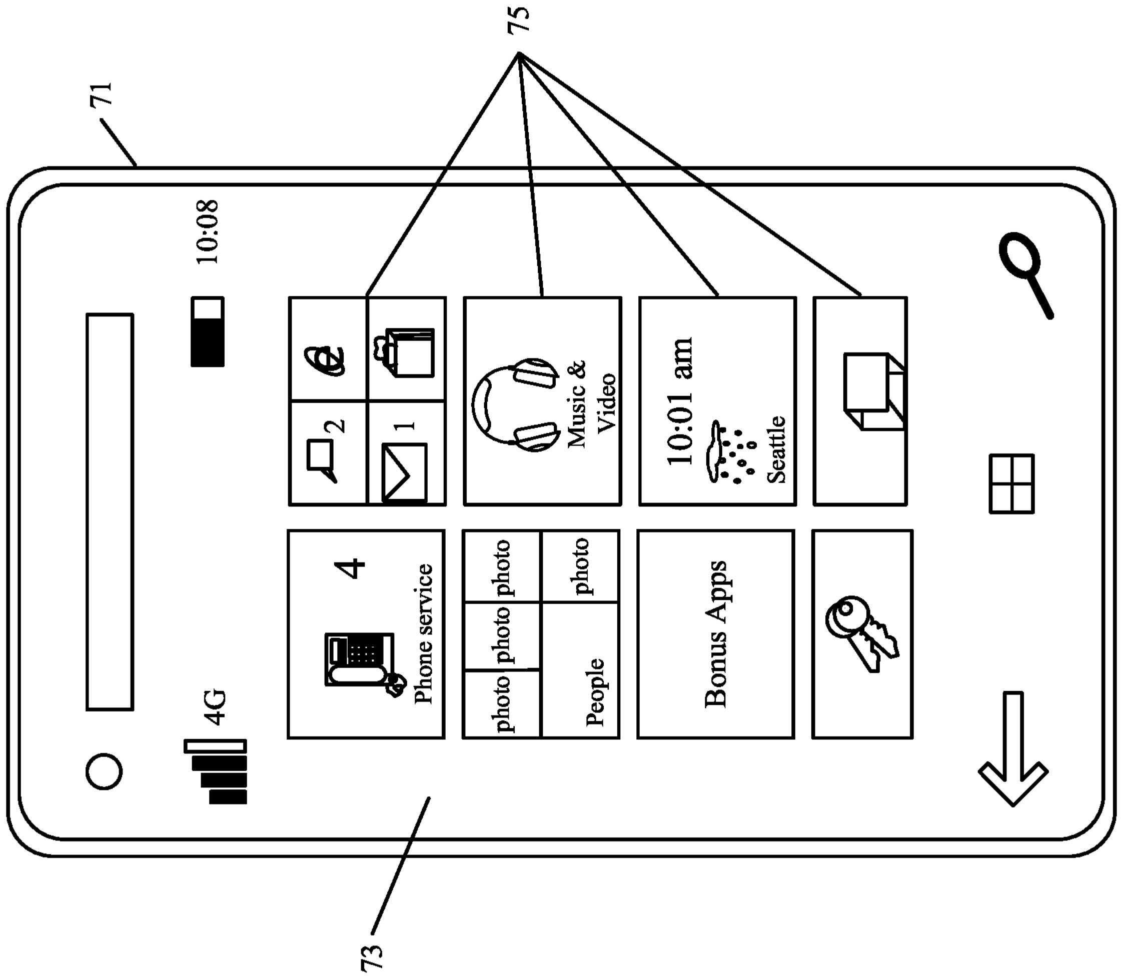
Figure 12:
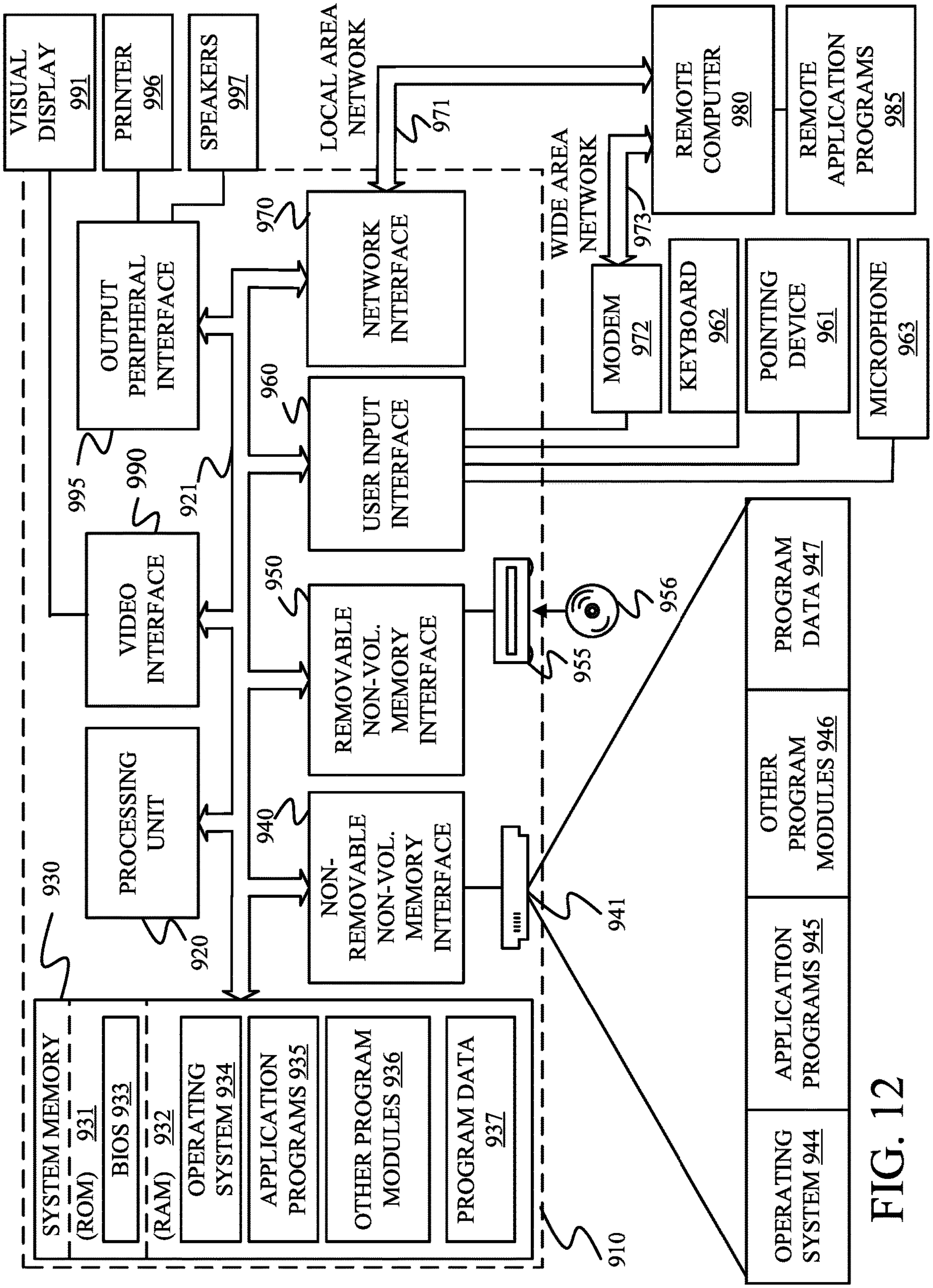
FIG. 12 is a block diagram showing one example of a computing environment that can be used in the architectures shown in the previous FIGURES.

FIG. 9 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of machine 108 for use in generating, processing, or displaying the stool width and position data. FIGS. 10-12 are examples of handheld or mobile devices.

FIG. 9 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processors 218 and/or 242 from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and/or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 850. In FIG. 10, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 12 is one example of a computing environment in which elements of FIG. 2, or parts of it, (for example) can be deployed. With reference to FIG. 12, an example system for implementing some embodiments includes a general-purpose computing device in the form of a computer 910. Components of computer 910 may include, but are not limited to, a processing unit 920 (which can comprise processors or servers from previous FIGURES), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 12.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 936, and program data 937.

The computer 910 may also include other removable/non-removable volatile/nonvolatile computer storage media. By way of example only, FIG. 12 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 910. In FIG. 12, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 12 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a worksite control system comprising:

a communication system configured to receive weather data corresponding to a worksite;

a weather model generation logic configured to generate a weather model based on the weather data;

a worksite action identification logic configured to identify a worksite action based on the weather model; and a control signal generator configured to generate a machine control signal that controls a machine associated with the worksite based on the identified worksite action.

Example 2 is the worksite control system of any or all previous examples, wherein the worksite action identification logic is configured to identify a conditional rule that maps an input weather criterion in the weather model to the worksite action.

Example 3 is the worksite control system of any or all previous examples, and further comprising:

conditional rule selection logic configured to select the conditional rule from a plurality of conditional rules that each map an input weather criterion to a corresponding worksite action.

Example 4 is the worksite control system of any or all previous examples, and further comprising:

conditional rule generation logic configured to:

receive a weather criterion user input that defines the input weather criterion;

receive a worksite action user input that defines the worksite action; and generate the conditional rule based on the weather criterion user input and the worksite action user input.

Example 5 is the worksite control system of any or all previous examples, and further comprising:

user interface logic configured to:

generate a user interface with a weather criterion user input mechanism and a worksite action user input mechanism;

based on user actuation of the weather criterion user input mechanism, define the input weather criterion; and based on user actuation of the worksite action user input mechanism, define the worksite action.

Example 6 is the worksite control system of any or all previous examples, wherein the weather model is based on one or more of current weather on the worksite or a weather forecast for a future time period.

Example 7 is the worksite control system of any or all previous examples, wherein the machine control signal controls a mobile work machine comprising:

a set of ground engaging elements movably supported by the frame and driven by a power source to drive movement of the mobile work machine;

a movable element movably supported by the frame to move relative to the frame;

an actuator coupled to the movable element to controllably drive movement of the movable element; and a controller configured to generate an actuator control signal, indicative of a commanded movement of the actuator, and provides the actuator control signal to the actuator to control the actuator to perform the commanded movement.

Example 8 is the worksite control system of any or all previous examples, wherein the machine control signal comprises a restriction signal that restricts the commanded movement.

Example 9 is the worksite control system of any or all previous examples, wherein the worksite action identification logic is configured to:

determine that the weather model indicates a threshold wind speed; and generate, based on the determination, the restriction signal to set a height restriction for the movable element.

Example 10 is the worksite control system of any or all previous examples, wherein the worksite action identification logic is configured to:

determine that the weather model indicates a threshold temperature; and generate, based on the determination, a start-up signal to start an engine of the mobile work machine.

Example 11 is the worksite control system of any or all previous examples, and further comprising:

positioning system compensation logic configured to:

identify an impact of the weather at the worksite on positioning information generated by a position detection system associated with the mobile work machine; and generate compensated position information based on the identified impact.

Example 12 is the worksite control system of any or all previous examples, wherein the machine control signal controls a data storage system to store machine performance metrics that represent worksite performance of the mobile work machine and are correlated to the weather data.

Example 13 is the worksite control system of any or all previous examples, and further comprising:

machine servicing determination and control logic configured to:

determine an effect of worksite conditions, based on the weather model, on a component of the mobile work machine; and generate the machine control signal to control a communication system to send a notification to a remote computing system indicative of the effect on the component of the mobile work machine.

Example 14 is the worksite control system of any or all previous examples, wherein the worksite control system is configured to:

identify a plurality of worksite operations to be performed on the worksite;

determine an order for the worksite operations based on the weather model; and generate the machine control signal based on the determined order.

Example 15 is a method performed by a computing system, the method comprising:

receiving, by a communication system, weather data corresponding to a worksite;

generating a weather model based on the weather data;

identify a conditional rule that maps an input weather criterion in the weather model to a worksite action; and generating a machine control signal that controls a machine associated with the worksite based on the identified worksite action.

Example 16 is the method of any or all previous examples, wherein the weather model is based on one or more of current weather on the worksite or a weather forecast for a future time period.

Example 17 is the method of any or all previous examples, wherein the machine comprises a mobile work machine having a movable element movably supported by a frame and an actuator coupled to the movable element to controllably drive movement of the movable element, and further comprising:

generating a restriction signal that restricts a commanded movement of the actuator.

Example 18 is the method of any or all previous examples, and further comprising:

determining that the weather model indicates a threshold temperature; and generating, based on the determination, a start-up signal to start an engine of the mobile work machine.

Example 19 is a mobile work machine comprising:

a frame;

a set of ground engaging elements movably supported by the frame and driven by a power source to drive movement of the mobile work machine on a worksite;

a movable element movably supported by the frame to move relative to the frame;

an actuator coupled to the movable element to controllably drive movement of the movable element; and a control system configured to:

receive a restriction control signal that is based on a weather model indicative of weather corresponding to the worksite and represents a movement restriction; and generate an actuator control signal, indicative of a commanded movement of the actuator, based on the movement restriction.

Example 20 is the mobile work machine of any or all previous examples, wherein the control system is configured to:

determine that the weather model indicates a threshold wind speed; and set a height restriction for the movable element based on the movement restriction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:

obtaining a worksite condition corresponding to a worksite operation of a mobile work machine on a worksite;

generating a machine performance metric representing operational performance of the mobile work machine for the worksite operation on the worksite;

generating a machine impact metric based on a comparison of the machine performance metric and a base performance metric;

generating a correlation between the machine impact metric and the worksite condition; and controlling the mobile work machine based on the correlation.

2. The computer-implemented method of claim 1, wherein the worksite condition comprises a weather condition.

3. The computer-implemented method of claim 1, and further comprising:

receiving weather data corresponding to the worksite; and generating a weather model, that includes the worksite condition, based on the weather data, wherein the weather model models at least one of current weather on the worksite or a weather forecast for a future time period at the worksite.

4. The computer-implemented method of claim 3, and further comprising:

obtaining a plurality of worksite operations to be performed on the worksite, wherein controlling the mobile work machine comprises controlling the mobile work machine based on at least one of:

an estimated completion time for each worksite operation, of the plurality of worksite operations, based on the correlation;

an estimated fuel usage by the mobile work machine based on the correlation;

a machine deterioration indicator based on the correlation; or an execution order for the plurality of worksite operations based on the correlation.

5. The computer-implemented method of claim 3, and further comprising:

determining that the weather model indicates a threshold temperature, wherein controlling the mobile work machine comprises starting an engine of the mobile work machine.

6. The computer-implemented method of claim 3, and further comprising:

identifying the machine impact metric to represent performance of a position detection system associated with the mobile work machine; and generating compensated position information based on the machine impact metric.

7. The computer-implemented method of claim 1, wherein controlling the mobile work machine comprises compensating for an expected performance reduction caused by the worksite condition.

8. The computer-implemented method of claim 1, wherein the machine performance metric comprises at least one of fuel efficiency, time utilization, or productivity.

9. The computer-implemented method of claim 1, wherein controlling the mobile work machine comprises controlling a subsystem of the mobile work machine.

10. The computer-implemented method of claim 1, wherein controlling the mobile work machine comprises controlling a data storage component to store the correlation.

11. The computer-implemented method of claim 1, wherein controlling the mobile work machine comprises controlling a communication system to transmit the correlation.

12. A mobile work machine control system comprising:

at least one processor; and memory storing instructions executable by the at least one processor, wherein the instructions, when executed, cause the mobile work machine control system to:

obtain a worksite condition corresponding to a worksite operation of a mobile work machine on a worksite;

generate a machine performance metric representing operational performance of the mobile work machine for the worksite operation on the worksite;

generate a machine impact metric based on a comparison of the machine performance metric and a base performance metric;

generate a correlation between the machine impact metric and the worksite condition; and control the mobile work machine based on the correlation.

13. The mobile work machine control system of claim 12, wherein the worksite condition comprises a weather condition.

14. The mobile work machine control system of claim 12, wherein the instructions, when executed, cause the mobile work machine control system to:

receive weather data corresponding to the worksite; and generate a weather model, that includes the worksite condition, based on the weather data, wherein the weather model models at least one of current weather on the worksite or a weather forecast for a future time period at the worksite.

15. The mobile work machine control system of claim 14, wherein the instructions, when executed, cause the mobile work machine control system to:

obtain a plurality of worksite operations to be performed on the worksite, wherein the instructions, when executed, cause the mobile work machine control system to at least one of:

identify an estimated completion time for each worksite operation, of the plurality of worksite operations, based on the correlation;

identify an estimated fuel usage by the mobile work machine based on the correlation;

generate a machine deterioration indicator based on the correlation; or generate an execution order for the plurality of worksite operations based on the correlation.

16. The mobile work machine control system of claim 12, wherein the control of the mobile work machine comprises compensating for an expected performance reduction caused by the worksite condition.

17. The mobile work machine control system of claim 12, wherein the machine performance metric comprises at least one of fuel efficiency, time utilization, or productivity.

18. The mobile work machine control system of claim 12, wherein the instructions, when executed, cause the mobile work machine control system to control a subsystem of the mobile work machine.

19. The mobile work machine control system of claim 12, wherein the instructions, when executed, cause the mobile work machine control system to control a data storage component to store the correlation.

20. The mobile work machine control system of claim 12, wherein the instructions, when executed, cause the mobile work machine control system to control a communication system to transmit the correlation.

* * * * *